United States Patent [19]

Negi et al.

[11] 4,272,828
[45] Jun. 9, 1981

[54] ARITHMETIC LOGIC APPARATUS FOR A DATA PROCESSING SYSTEM

[75] Inventors: Virendra S. Negi, Pepperell; Arthur Peters, Sudbury, both of Mass.

[73] Assignee: Honeywell Information Systems Inc., Waltham, Mass.

[21] Appl. No.: 842

[22] Filed: Jan. 3, 1979

[51] Int. Cl.³ .............................................. G06F 7/50
[52] U.S. Cl. .................................... 364/900; 364/768
[58] Field of Search ... 364/200 MS File, 900 MS File, 364/749, 768, 778, 784

[56] References Cited

U.S. PATENT DOCUMENTS

| | | | |
|---|---|---|---|
| 3,030,019 | 4/1962 | Smith | 364/200 |
| 3,988,717 | 10/1976 | Kisylia | 364/200 |
| 4,064,554 | 12/1977 | Tubbs | 364/200 |
| 4,079,451 | 3/1978 | Woods et al. | 364/200 |
| 4,085,450 | 4/1978 | Tulpule | 364/900 |

*Primary Examiner*—James D. Thomas
*Assistant Examiner*—Thomas M. Heckler
*Attorney, Agent, or Firm*—John S. Solakian; Nicholas Prasinos; William W. Holloway

[57] ABSTRACT

Arithmetic logic apparatus having two independent register files, one for each operand. Each register file has also associated therewith independently controlled incrementing and/or decrementing address mechanisms. Each such register file is coupled for addressing on a digit, byte or word basis. Operation of such apparatus is under the control of control instructions received from a control store included in a data processor in which such apparatus is also included.

11 Claims, 7 Drawing Figures

ARITHMETIC LOGIC APPARATUS FOR A DATA PROCESSING SYSTEM

RELATED APPLICATIONS

The following applications are incorporated by reference to the instant application.

1. "Binary Coded Decimal Correction Apparatus" invented by Virendra S. Negi and Arthur Peters, filed on even date herewith and having Ser. No. 000,738 and assigned to the same assignee named herein.

2. "Control File Apparatus for a Data Processing System" invented by Virendra S. Negi and Arthur Peters, filed on even date herewith and having Ser. No. 000,733 and assigned to the same assignee named herein.

3. "Control Store Address Generation Logic for a Data Processing System" invented by Arthur Peters and Virendra S. Negi, filed on even date herewith and having Ser. No. 000,864 and assigned to the same assignee named herein.

BACKGROUND OF THE INVENTION

The present invention relates generally to data processing systems and more particularly to arithmetic logic units included therein.

Some data processors have the capability of operating upon data which is a multiple of, for example, four, eight or sixteen bits, i.e., digits, bytes and words respectively. Such data or operands are available from memory associated with the data processor only on a sixteen-bit or word basis. Further, more data processor instructions operate on two operands which, in general, are of an unequal length. The result of such data processing usually replaces one of the operands. In the processing of instructions of this type, the following requirements should be met. There is a need to locate the starting and end points of data in the memory word. Further, there is a need to step sequentially from one unit of data to the next unit of data. In addition, data must be processed in either direction from the least significant bit to the most significant bit or vice versa, and, in addition, invalid combinations must be detected in one or both operands. Operands of unequal length must also be compensated for in order to provide a correct result.

It is accordingly a primary object of the present invention to provide an improved arithmetic logic apparatus for use in a data processing system.

SUMMARY OF THE INVENTION

The above stated objects and other objects are achieved according to the present invention by providing apparatus for receiving information such as two operands for purposes of providing an arithmetic operation, such as an add operation or a subtract operation with respect thereto. Such apparatus for receiving is coupled to first and second register files, each of such files including a plurality of locations for storing such information in the form of words. The words each include at least two portions, each of such portions comprising at least two sub-portions. For example, the two portions may be of byte (8-bits) length and the sub-portions may be of digit (4-bit) length. First and second address registers are also provided wherein a first portion of the contents of each of such registers is utilized for respectively addressing a location in the first and second register files. First and second selection apparatus are also provided, which are responsive, respectively, to the second portion of the contents of the first and second address registers, whereby either a portion or a subportion of the word addressed by the apparatus by means of such registers is selected. An arithmetic unit is also provided for operating on the selected portion or a sub-portion in order to produce the desired result.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT

Figure 1:
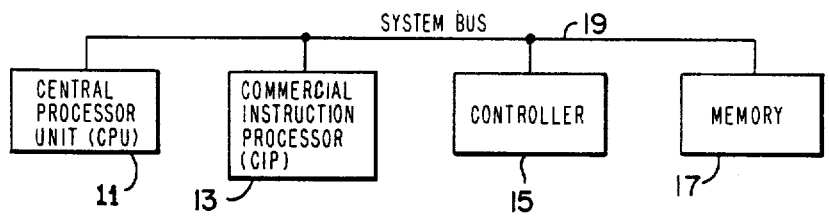
FIG. 1 is a block diagram illustrating the overall system configuration incorporating the present invention.

Referring to FIG. 1, a commercial instruction processor (CIP) 13 is provided to expand the shown in the system configuration of FIG. 1, instruction set capabilities of CPU 11 by using a powerful set of commercial type instructions. These instruction types allow the CPU, via the CIP, to process decimal and alphanumeric data; the instruction types are listed as follows: Decimal, Alphanumeric, Data Conversion and Editing. CIP communication with the CPU and main memory 17 is over conducted via a common system bus 19 under control of bus controller 15. The CIP operates as an attachment to the CPU and receives instructions and operands as transfers from the CPU and/or memory. The CIP executes the commercial instructions as they are sent over the bus 19 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
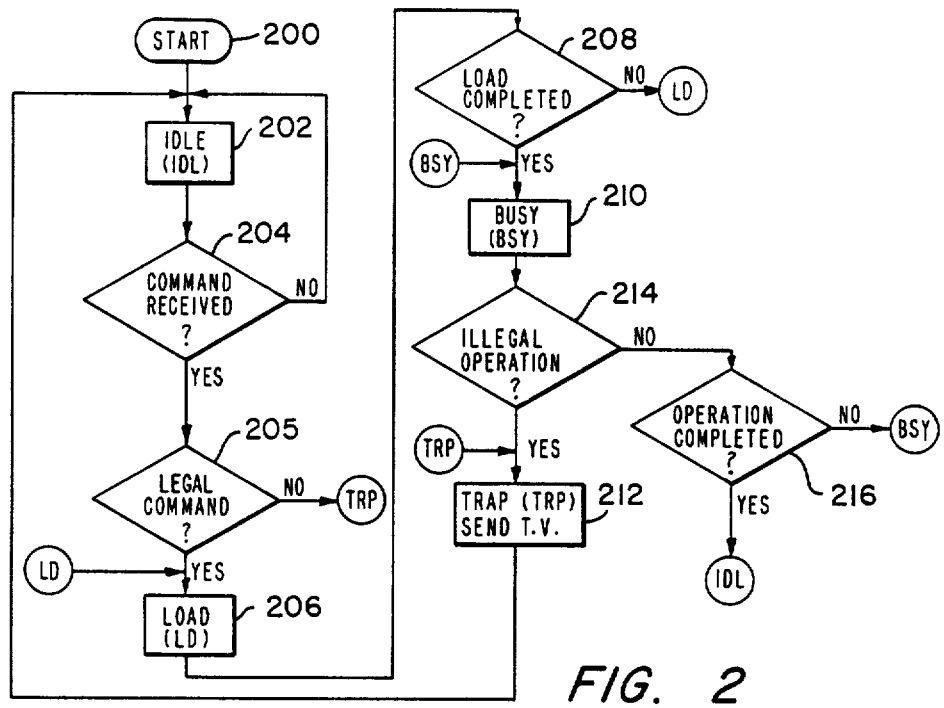
FIG. 2 is an operational sequence state diagram illustrating the basic operation of the processor of the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully received (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) the CPU sends the co-code (i.e., the first word of the commercial instruction) to the CIP and the CIP enters the load state when it accepts the op-code; (ii) the CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word. As second and third operands are encountered, the CPU performs the applicable procedures in steps ii and iii.

At this point, the CIP is loaded with all of the necessary information required to execute the commercial instruction and enters the busy state to execute the instruction. When necessary, the CIP communicates directly with main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurs: (i) the CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU responds in the following manner. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equal eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
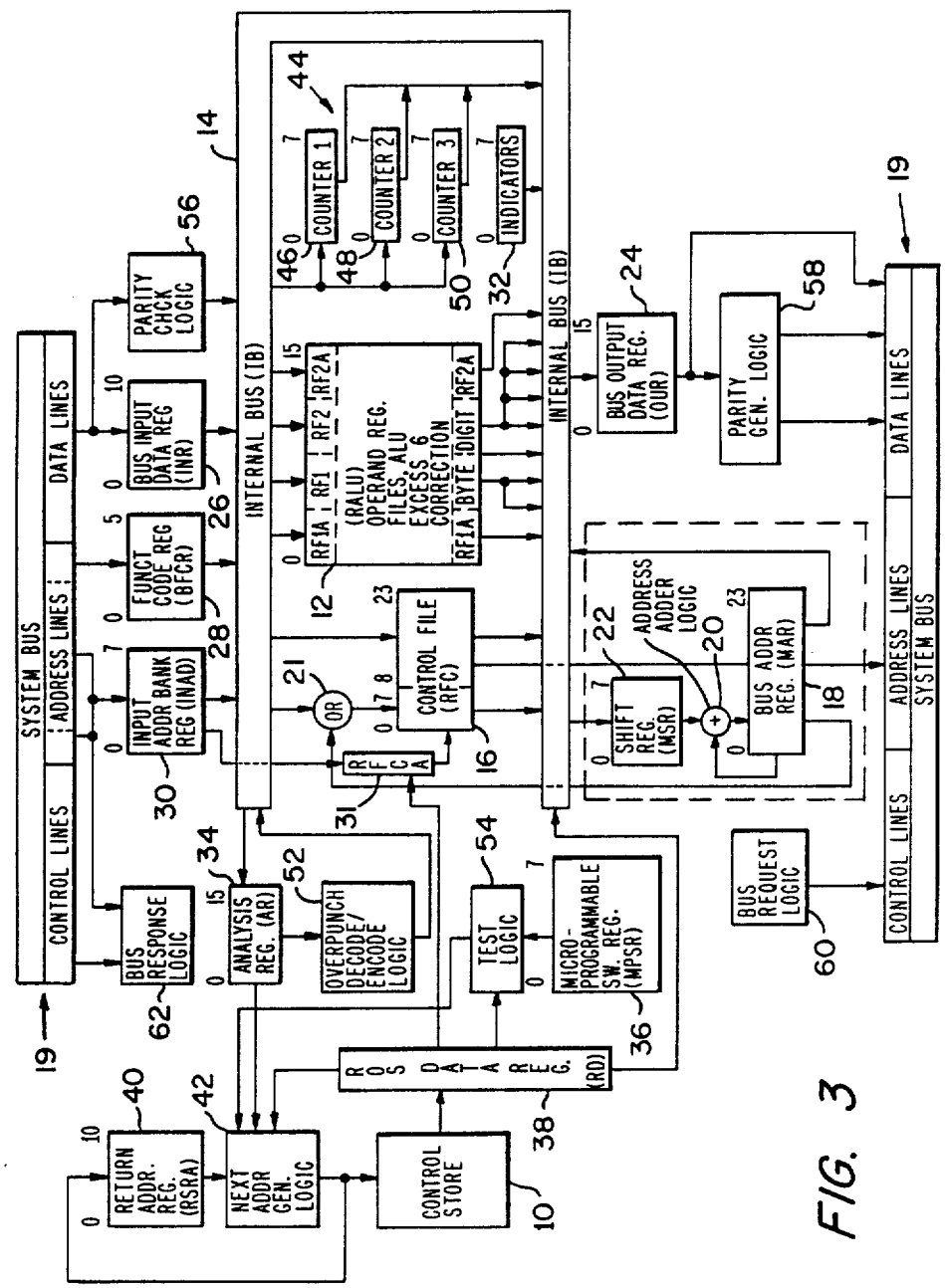
FIG. 3 is a block diagram of the processor of the present invention.

FIG. 3 is a major block diagram of the commercial instruction processor 13 of the present invention, showing all of the major data transfer paths between the processor's registers.

The control store 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from a current product counter to the ALU or from operand register file 2 to a multiply register. The 8-bit ALU (which is comprised of two 4-bit ALU chips, a carry look-ahead chip, and a carry in/carry out flip-flop) is capable of performing the following logical operations on operands presented at its two inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output mutiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A—Register File 1 Address Register, RF2A—Register File 2 Address Register and ALM-R—ALU Mode Control Register. These registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

Still referring to FIG. 3, the control file 16, also referred to as register file C (REC), is a 16 location by 24 bit random access memory (RAM) that is primarily used to store all instruction related information that originates from the CPU 11 (e.g., task words, data descriptors, effective addresses, etc.). The control file also contains several work locations which are used by the processor (CIP) firmware. The control file 16 receives bits 0–7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit, two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper byte or the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
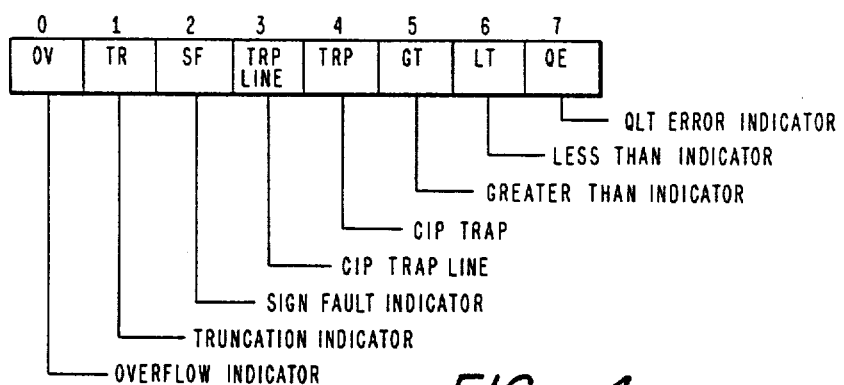
FIG. 4 illustrates the contents of one of the registers used in the processor of the present invention.

The CIP indicator register 32 is an 8-bit storage register in which each bit can be individually set or reset. The indicator register bit configuration is shown in FIG. 4. The TRP and TRP LINE indicators are used by the CIP 13 for internal processing only and are not software visible. The TRP LINE (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2 (CTR2), and Counter 3 (CTR3). These counters are loaded/unloaded via the internal bus 14. The contents of each counter are available for test and branch operations.

The overpunch byte decode/encode logic 52 includes two 512-location by 4-bit PROM chips that are used to decode/encode the contents of the analysis register (AR) 34. The byte being decoded is obtained from AR bits 1 through 7 and the digit being encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunch byte decode/encode logic is available on both halves of the internal bus 14.

The CIP test logic 54 selects one of 32 possible firmware test conditions for iput to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, mixed branch, major branch, or subroutine return. Direct Address: this method is used when an unconditioned branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firmware page being a 128-location segment within the control store). This is accomplished by using control store bits 41, 42, 43, 44 and 50 to select a test condition. Then, depending on the condition of the tested function, a branch is performed to one of two locations. The branch operation performed under this method is modulo 2 (i.e., the two possible branch addresses are two locations apart). The modulo 2 address is developed as follows: (1) if the test condition is satisfied, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page. Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,981.

Figure 5:
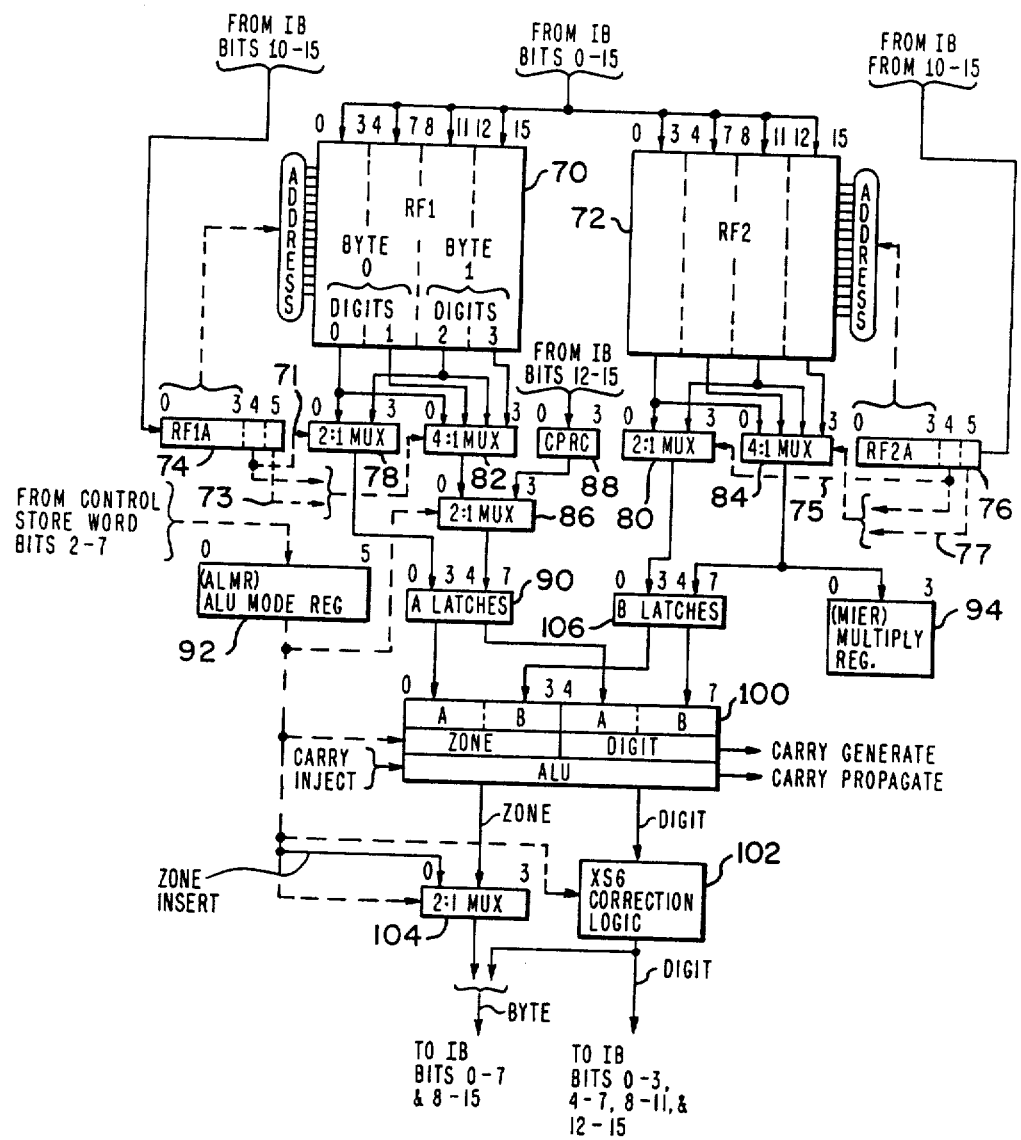
FIG. 5 is a detailed block diagram of the arithmetic unit of the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e., by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the outut of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digit from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/-down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provides addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating with decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal add mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three high-order bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII or EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. The ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus 14. Bits 1, 2 and 3 are used to control operations within the ALU. Bit 4 specifies whether the zone bits are forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input multiplexers. Register RF2A provides the addresses and controls for register file 2 and the associated ALU input multiplexers.

The control file 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address associated with them, which address corresponds to the RFC 16 location being loaded. This address originates from either the function code register 28 or the control store 10. Thus, the RFC address is directly related to the type of data being delivered by the CPU 11, or as indicated by the function code.

The following is a more detailed description of the RALU logic of FIG. 5. The RALU consists basically of the two register files RF1 and RF2. These register files are, by way of illustration, comprised of four RAM chips of the type 74S189 and these register files each have 16 locations, each location 16 bits wide. Each of these register files has the capability of being written into any digit (4 bits), byte (8 bits) or word (16 bits) inside this register file. The two register files RF1 and RF2 are primarily used for storage of the two operands, i.e., operand 1 and operand 2, as they are read from main memory.

The CIP instructions are based on either a digit, a byte or a word. Thus, there must be the capability in the CIP of operating on any digit, any byte, or any word, and sequencing through the operand either a digit at a time or a byte at a time as the case may be. As the operands are read from main memory, they are transferred into the CIP through the internal bus and written into RF1 or RF2. As they are read, the entire operands are loaded into these two register files. Once the operands have been loaded into the register files, the RALU has to operate from either the least significant end of the operands or the most significant end of the operands. The mechanism for addressing this register file is controlled by their address registers RF1A 74 and RF2A 76. For proper control, the direction of RALU operation must be specified. For example, assume a decimal add instruction which adds operand 2 to operand 1 and writes the result back into operand 2. Basically operand 2 is read into the register file 2 (72) and operand 1 is read into register file 1 (70). Once the operands have been written into RF1 and RF2, the address of the least significant end of the two operands is computed and loaded into the two address registers RF1A and RF2A respectively.

The RF1A and RF2A registers have the capability of incrementing or decrementing their contents by either a digit, a byte or a word, since operating proceeds on a digit, a byte, or word basis. For example, in the add instruction, the least significant digit of operand 1 is added to the least significant digit of operand 2 and the result is written back into the least significant digit of operand 2. The starting position of either of these two operands could be at either digit boundary, which means that operation could start on either digit or either byte, as the case may be depending upon whether the operand is packed or string-zoned. Packed means that there are 4 bits per digit of operand data. String-zoned means a full byte which is 8 bits per digit of data. The 8 bits are the zoned bits plus the digit bits which comprise a string byte. Once the address of the least significant digit of the two operands is determined, an operation takes place on the least significant digit and there is a decrement of the two addresses RF1A and RF2A to point to the next least significant digit to operate at the next cycle.

RF1A and RF2A and 6 bit registers and they are comprised of 4 bits (0-3) which are in the form of an incrementor and/or decrementor and 2 bits (4 and 5) which are in the form of two flip-flops. The upper 4 bits of RF1A and RF2A are used to select a word (a 16 bit location) inside the two register files, whereas the lower 2 bits, bits 4 and 5, are used to select the digit or the byte out of this 16 bit word being fetched out of RF1 or RF2. The low order 2 bits of these address registers are used to control the multiplexers 78 and 82 for RF1 and 80 and 84 for RF2, through use of the control lines 71 and 73 for RF1 and 75 and 77 for RF2.

The selection of the digit or the byte out of register file 1 will now be discussed. The two bits, bits 4 and 5, of RF1A can have four different binary values, 00, 01, 10 or 11. These values could be thought of as corresponding to digits 0, 1, 2 or 3 and bits 4 and 5 together are the digit select bits. Therefore, where there is an attempt to select byte 1 of RF1 (i.e., digits 2 and 3), bit 4 of RF1A should be a 1 and bit 5 of RF1A should also be a 1. Basically, bit 4 selects the digit 2 out of the multiplexer (MUX) 78 and bits 4 and 5 together select digit 3 out of the multiplexer (MUX) 82. Thus, the output of MUX 78, together with the output of MUX 82 are the digits 2 and 3 of RF1, i.e., byte 1. The selection of such bytes or digits from the word out of RF1 is controlled by the upper 4 bits of RF1A, because these upper 4 bits are used to select one of the 16 locations inside the RF1. Thus, the digits or the bytes which are selected are really the digit or the bytes out of the word being addressed in RF1.

The digit output of the multiplexer 82 is further multiplexed with the output of the current product counter (CPRC) 88. This multiplexing is basically used during the execution of the multiply or divide order to select a digit either out of the register file or the current product counter. The CPRC has previously been loaded through the ALU with a digit of a partial product in the case of a multiply instruction, or in the case of a divide instruction, it normally contains the partial quotient as the quotients are being generated. The final byte output from the RF1 consists of the output of MUX 78 and the output of the MUX 86. This output is passed through a latch 90, which is basically used to latch the output of these multiplexers during the write cycle into the register files. This is so because the register files are implemented such that the output is disabled during the write cycle and, accordingly, so that undefined data cannot pass back into the ALU to change the result thereof during the write operation.

The selection of the multiplexer 86, which selects either the output of MUX 82 or CPRC 88 is controlled by a bit in the ALU mode register (ALMR) 92 which is loaded through certain bits of the control store word. When such bit is set to a binary one, it indicates that the output should be selected from the CPRC instead of the MUX 82.

A very similar organization exists for the RF2 associated logic, i.e., the multiplexers 80 and 84 which correspond to the multiplexers 78 and 82 coupled with RF1. These multiplexers are selected by the RF2A bits 4 and 5. The CPRC register 88 is only coupled with the RF1 associated logic of the RALU. Accordingly, a multiplexer corresponding to MUX 86 is not required. Another register, which is not used in association with RF1 is the MIER register 94 which is loaded from the output of multiplexer 84 under control of the microprogram. This register is used to store the multiplier digit during a multiply instruction or is used during a divide instruction to store the high order digit of a partial remainder. The B latches 106 latch the outputs from multiplexers 80 and 84 and serve a purpose similar to that of the A latches 90.

The ALU 100 includes two ALU chips. One of these chips is used for the low order 4 bits of the byte and functions basically as the digit ALU while and the other chip provides the ALU operations on the high order 4 bits of the byte and functions basically as the zone ALU. The zone and the digit ALU together combine to form the byte ALU, which is the maximum capability of the RALU, i.e., it can operate on a byte basis. As seen in FIG. 5, the 2 ALU chips of ALU 100 have A inputs and B inputs. The low order (digit) ALU takes the digit inputs from the zone 4 bits (4-7) of the latch 90 and the low order 4 bits of the latch 106. The low order ALU processes the high order 4 bits (0-3) from the latches 90 and 106.

The two outputs of the two ALUs, i.e., digit and the zone outputs, are further passed through logic to generate the final result of the ALU operation. The digit portion of the ALU is passed through the excess 6 correction logic 102, whereas the zone output passes through a multiplexer 104 which selects either the zone output of the ALU or the special zone insert bits under control of the ALU mode register 92. For example, in string decimal operations, the zone bits have to be a constant of 3 (binary 0011). The selection control of the multiplexer 104 is provided by the ALU mode register for either a decimal arithmetic mode or binary mode. In the case of a decimal arithmetic mode, the zone bit is forced through the zone insert logic and, during the binary operation, the zone bits are used directly as received from the zone ALU output, since the entire 8 bits of the result comprise the binary 8 bit result. The final outputs of the multiplexer 104 and the excess 6 correction logic 102 are enabled onto the internal bus of the CIP, which is fed back to the input of RF1 and RF2, as shown in FIG. 5.

There are basically two different types of commands which can be executed to unload the result onto the internal bus. One command is used for unloading the digit result, and the other command is used for unloading the byte result. Basically, the unload digit command is used for packed decimal operations and the result of this unload digit command is that the digit result, being the 4 bit result, is duplicated into all 4 digits (bits 0-15) of the internal bus. Whereas, during the string operation, whether it be a string decimal or an alphanumeric byte operation, the byte result, which consists of the 4 bits of the zone and the 4 bits of the digit, is enabled onto both bytes of the internal bus, thereby forcing bits 0 through 7 to be the same as bits 8 through 15 of the internal bus. This result, whether it be a byte result or a digit result, is enabled onto the internal bus which, in turn, is enabled onto the inputs of RF1 or RF2 under control of the write control logic to be described subsequently. The ALU result is thus written into locations of RF1 and RF2 as addressed by their address registers RF1A or RF2A.

The basic ALU operation is controlled by the contents of the ALMR register 92. This register is loaded with the controls specifying the specific operation to be executed between the two operands A and B included in the ALU. The operations could be, for example, add, subtract, binary OR and similar arithmetic operations. The ALMR register 92 is loaded from bits 2 to 7 of the control store word under microprogram control.

Figure 6:
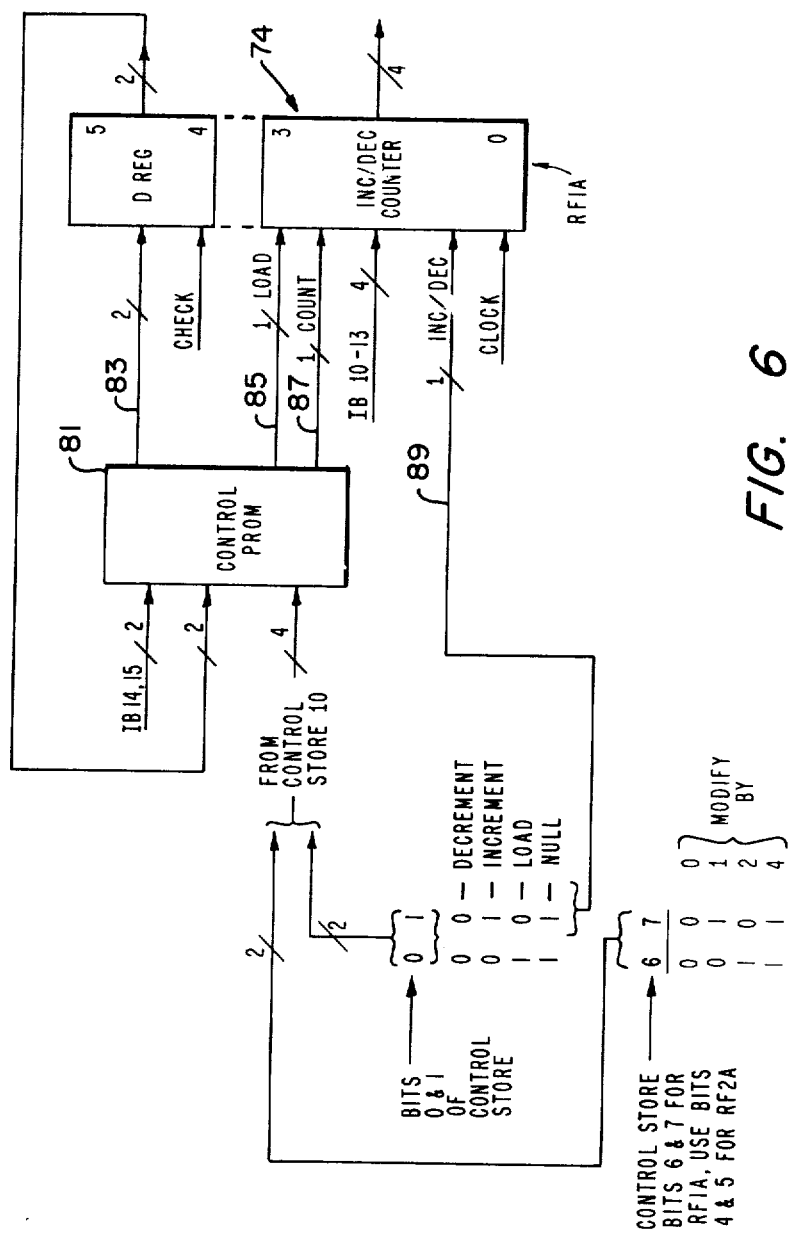
FIG. 6 is a schematic diagram illustrating the details of the control logic utilized with the control file of the processor of the present invention.

FIG. 6 is a detailed diagram of the RF1A and RF2A control logic. For ease of explanation, the following description will be limited to the RF1A register control logic 74 only, since RF2A is a duplication of the RF1A control logic. RF1A, as mentioned earlier, is a 6 bit register. This 6 bit register is divided into two sections, one being the high order 4 bits, 0 to 3, and the other being the low order bits, bits 4 and 5. The high order 4 bits, bits 0 to 3, are organized as a counter 74a which can be incremented or decremented, whereas, the other two low order bits constitute a 2 bit D register 74b, i.e., 2 D-type flip-flops. The counter chip for the high order 4 bits may be the type 74S169, which is an available up-down counter circuit.

The functions required of the register RF1A are that it can be loaded with a 6 bit value from the internal bus and, further, that it can be incremented or decremented by a value of 1,2 or 4 under the control of the control store. The control of this 6 bit address register is provided by a control PROM 81. The control PROM is a 256 by 4 locations PROM chip. The four outputs of the control PROM are as follows: two of the output bits are directly connected as the D inputs for the bits 4 and 5 of the register 74 and the other two outputs of the control PROM are used for the load and the count control of the counter chip 74a which contains the upper 4 bits of RF1A. The 8 address lines of the control PROM consist of two bits supplied from the internal bus data, bits 14 and 15, two bits supplied from the output of the D register 74b (bits 4 and 5 of RF1A) and 4 bits supplied from the address control lines from the control store. Basically, these 8 address lines are the control functions and they control the 4 output lines of the control PROM 81. Depending on the values on these address lines, the corresponding locations inside the control PROM are coded with predetermined 4 bit values to control the increment/decrement functions of RF1A.

The four control lines from the control store coupled to the control PROM 81 can be divided into two 2 bit fields. The first 2 bit field consists of bits 0 and 1 which define control functions such as increment, decrement, or load. A code of 00 indicates that the address register (RF1A) has to be decremented; 01 indicates that the address register needs to be incremented; 10 controls the loading of the RF1A register, whereas 11 indicates no operation, which basically means preserve the prior contents of such register. The second half of this 4 bit field, in the case of RF1A, corresponds to bits 6 and 7 of the control store, and, in the case of RF2A, corresponds to bits 4 and 5 of the control store. These 2 bits (6 and 7 or 4 and 5) indicate the quantity by which the address register has to be incremented or decremented. The four cases are 00 indicating no increment or decrement, 01 indicating modification by 1, 10 indicating modification by 2, and 11 indicating modification by 4. These 4 bits are controlled by appropriate coding of the microprogram or firmware in the control store.

By way of example, the load function will now be discussed. If the control store word indicates load the register, and if bits 0 and 1 of the control store word have a value of binary 1, 0, the control PROM 81 is coded to pass the value of the IB bits 14 and 15 out on the two control lines 83 to be loaded directly into the lower 2 bits of RF1A 74. Also, a signal on line 85, which is the load line for the counter portion of RF1A, goes low thereby enabling the 4 bits from IB, bits 10 to 13, to be loaded into the counter bits 0 or 3 of RF1A, at the time when the CIP clock makes a transition from a low to a high level. It should be understood that the load function of the counter overrides the increment/decrement input 87 which corresponds to the increment/decrement bit of the control store bit 1, bit 1 being high (1) indicating an increment and low (0) indicating a decrement. In the case of a null operation which means that no modification or load operation is being performed on RF1A, the control PROM is coded to pass the two bits, bits 4 and 5, of the RF1A through the control PROM as they are, without any modification, to be recirculated within the register at every clock time. At the same time during a null operation, the load and the count inputs of the counter are disabled and at the next clock time nothing happens within the counter and the prior contents of the counter remain unmodified.

In the case where there is to be either an increment or decrement of the counter by either 1, 2 or 4, the corresponding control bits which are input to the control PROM 81 will have their respective values. For example, for the increment operation, bits 0 and 1 of the control store are a binary 0, 1 respectively. If there is to be an increment of RF1A by the value 2, bits 6 and 7 of the control store will be coded 1, 0 respectively, as indicated in FIG. 6. Depending on what the value of bits 4 and 5 were prior to this increment, the output 83 of the control PROM will be coded to increment these prior values. For example, assume that bits 4 and 5 had the binary value of 0, 1. This being the case, then the two inputs to the control PROM which are basically the outputs of the bits 4 and 5 of RF1A will also have a value 0, 1. When incrementing by 2, the control PROM is coded such that the output 83 of the control PROM is 0, 1 plus 2 which equals 3 (binary coded as a 11), and at the next clock time this 11, which is the input to the D register for bits 4 and 5, is loaded into that register and the new output of those bits 4 and 5 ends up being a 1,1. In this particular case, since we see that a 01 + a 2 ends up being a 1,1 which is the maximum value those 2 bits can have, there will not have to be a propagation of a carry or a borrow from these 2 bits into the high order 4 bits which are included in the counter. In this case, the count output from the control PROM on line 87 will be disabled and no modification will take place in the counter portion of the RF1A.

As another example, assume that the value of bits 4 and 5 is a 1,1 and there is to again be an increment by 2. Accordingly, the control PROM 81 will be coded with the previous value 1,1, which when added to a value of 2 produces the value of 0,1 plus a carry into the high order 4 bits included in the counter. This carry is coded into the count output of the control PROM, basically, the output 87, thereby enabling a count of the counter. Since the value of the increment line 89 is a 1 for the increment case, this counter will be forced to count by 1. Accordingly, what has been accomplished is an increment of the entire count of RF1A by the value of 2. If it was binary 000111, what has been done by adding 2 to that value is to produce the value 001001. Thus, if the previous value was a 7, then adding a 2 produces the value of 9 in the 6 bits of the counter.

It has been seen that the control PROM is basically a memory which has been precoded to the required values for the outputs which control the two segments of RF1A. This control PROM is by way of example a 256 locations by 4 bit PROM. The 256 locations are basically the addresses corresponding to different values available on the 8 address lines of this PROM chip. Knowing what the control lines are, basically what the addresses are of the control PROM, one can code the PROM chip to predetermined values to control the operation of RF1A and RF2A. The RF2A logic is very similar to the logic for RF1A, the only difference being that the bits 6 and 7 of the control store are replaced with bits 4 and 5 of the control store which are used to control the increment and decrement values for RF2A.

Figure 7:
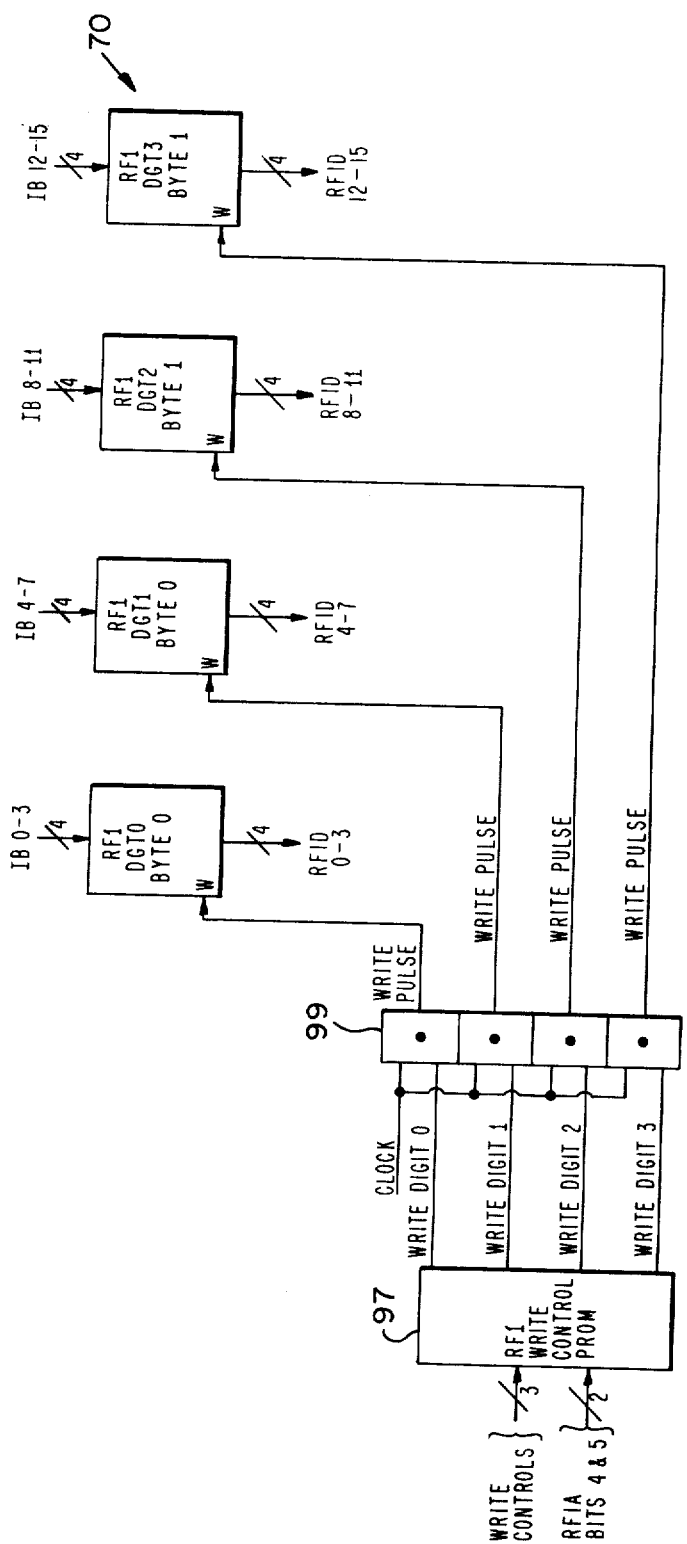
FIG. 7 is a schematic diagram illustrating the write control logic utilized with the control file of the processor of the present invention.

The following describes the operation of the write control logic of the register files inside the ALU, basically, the register files RF1 and RF2. FIG. 7 illustrates a detailed diagram of the register file RF1 along with its control logic for writing operations. The organization and logic for register file RF2 is similar and need not be separately discussed. As mentioned earlier, the register file is divided into four segments which are 4 bits wide. Each of these segments can be considered to be the digits inside the register file, for example, the bits 0 through 3 will correspond to digit 0, bits 4 through 7-digit 1, etc. until digit 3 corresponds to bits 12 through 15. Since the operations in the CIP require computation on a digit or a byte basis, digit being a 4 bit piece of information and a byte being an 8 bit piece of information, the hardware included in the CIP is required to manipulate data on a digit or a byte basis. This manipulation of data results in the requirement to write the data by digits or by bytes as the computation proceeds either left to right or right to left, as the case may be.

The following discussion assumes that the operands have been read into the register files RF1 and RF2, and that the operands have been selected through the multiplexers, i.e., the digit and the zone multiplexers, which have been previously described, have been operated on via the ALU, with the resulting output of the ALU being fed back through the internal bus (IB) and enabled onto the source side of RF1. The logic which controls the writing of this data into the register file is controlled by the write control PROM 97 shown in FIG. 7. PROM 97 receives its control inputs through the three bits of write control and two bits of address from the bits 4 and 5 of RF1A or RF2A as the case may be, depending on whether the writing is into RF1 or RF2. The three lines of write control can be direct control lines indicating that the hardware perform either a digit write operation (i.e., a 4 bit write), a byte write operation (i.e., an 8 bit write), or a word write operation (i.e., a 16 bit write). These three control signals could be coded as, for example, 000 being no write or for example with the high order bit having a value of 1, so 100 still being a no write, 101 being a write of 1 digit, 110 being a write of 1 byte and 111 being a write of the entire word. It should be noted that the write operation takes place into a location inside RF1 which is being addressed by the upper 4 bits of RF1A, that is bits 0 to 3, which addresses one of the 16 locations inside the respective register files.

Thus, the write control logic basically controls the writing of information into different digits or bytes at that particular location being addressed. The outputs of the write control PROM 97, which are predetermined prior by appropriate coding, are gated with a clock through AND gate logic 99 to generate a pulse which in turn is coupled to the individual logic corresponding to the different digits of the register file to enable the write pulse to perform the write operation in these register files. Depending on the write control being either a write digit, write byte or a write word, along with the two low order bits, bits 4 and 5 of RF1A, the corresponding output lines of the write control PROM 97 are coded to correspond to the respective digits of RF1. For example, a line is dedicated for write digit 0, another line dedicated for a write digit 1, a third line dedicated for write digit 2, and a fourth line dedicated for a write digit 3. For example, if a microprogrammer codes in a write digit, that means that there is an attempt to write 4 bits only, and, at that particular time when he is doing the write of a digit, the two bits of RF1A, bits 4 and 5, happen to be 0,1, that is addressing digit 1 of RF1. At that time, when the write digit operation is performed, the output on write digit 1 line of the control PROM 97 will be high and when gated with the clock signal, out of the AND gate 99 there will be generated a write pulse for the digit 1 of register file 1. Similarly, if a write byte operation is performed, during a write byte operation only bit 4 of RF1A is used to control which byte is to be written. For example, if bit 4 is 0, then byte 0 of RF1 which comprises digit 0 and digit 1 is altered, and if bit 4 is a 1 which corresponds to byte 1, then during a write byte operation, the byte 1 of RF1, corresponding to digit 2 and 3, is loaded with the data from the internal bus. This is a simple mechanism for individually controlling the write signals on these register files.

If a write of a word is required, this means that all 16 bits of that address location inside the register file have to be loaded from the internal bus. Accordingly, of the control PROM 97, binary ones are coded into all the four digit write signals thereby generating a write pulse into all four digits so that writing of the entire word of information into the register file is accomplished.

Having described the invention, what is claimed as new and novel and for which it is desired to secure Letters Patent is:

1. Arithmetic logic apparatus comprising:
    A. means for supplying operand data to be arithmetically processed;
    B. register file means having a plurality of storage locations for storing said operand data in word units, each of said word units being partitioned into a plurality of byte units and each said byte unit being partitioned into a plurality of digit units;
    C. an arithmetic unit for arithmetically processing said operand data;
    D. selection means for feeding data stored in said register file means to said arithmetic unit for processing;
    E. address means for supplying address data to said register file means for accessing operand data stored therein and for supplying selection data to said selection means for controlling the latter to feed accessed operand data from said register file means to said arithmetic unit in either byte units or digit units; and
    F. control means coupled to said address means for modifying said address data and said selection data in a timed sequence whereby word units of said operand data are selectively accessed in said register file means and fed to said arithmetic unit sequentially in byte units or in digit units for either byte-order processing or digit-order processing.

2. The apparatus of claim 1 wherein said register file means comprises first and second register files storing a pair of operand word units for processing with one another.

3. Apparatus as in claim 2 further comprising:
   A. product register means coupled to the output of said arithmetic unit for storing the result of said arithmetic processing; and
   B. means included in said control means for modifying said selection data during selected processing cycles to control said selection means to feed the data stored in said product register means to said arithmetic unit for processing instead of the data in said second register file.

4. Apparatus as in claim 2 further comprising:
   A. memory means for supplying a control instruction;
   B. a mode register storing mode control data; and
   C. means for coupling a first portion of said control instruction and said mode control data to said selection means to enable the latter to feed operand data in said second register file to said arithmetic unit for processing with operand data from said first register file.

5. Apparatus as in claim 4 wherein said arithmetic logic apparatus is included in a data processing system and wherein said memory means comprises:
   A. means for storing a plurality of programmable control instructions for controlling the operation of said system; and
   B. means for addressing said memory means to selectively supply said control instruction, whereby said selection means is enabled on a programmable basis and said arithmetic unit is controlled to perform program-selected arithmetic operations.

6. Apparatus as in claim 5 wherein said program selected operations include add and subtract arithmetic operations.

7. Apparatus as in claim 5 wherein said programmable control instructions are fed to said address means to supply modified address data and selection data thereto for controlling the sequence in which said operand data is accessed and fed to said arithmetic unit.

8. Apparatus as in claim 1 wherein said control means is adapted to increment said address data and said selection data to modify said data in accordance with an increasing arithmetic progression.

9. Apparatus as in claim 1 wherein said control means is adapted to decrement said address data and said selection data to modify said data in accordance with a decreasing arithmetic progression.

10. Apparatus as in claim 1 wherein said word units are 16 bits in length, said byte units are 8 bits in length, and said digit units are 4 bits in length.

11. Apparatus as in claim 5 wherein said address means includes read only memory means responsive to program control instructions supplied by said memory means and coded to provide said address data and said selection data in accordance with the type of arithmetic operation selected.

* * * * *